(12) United States Patent
Fukasawa

(10) Patent No.: US 7,461,387 B2
(45) Date of Patent: Dec. 2, 2008

(54) DISK DEVICE

(75) Inventor: Akihiro Fukasawa, Kyoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 379 days.

(21) Appl. No.: 10/526,401

(22) PCT Filed: Sep. 16, 2003

(86) PCT No.: PCT/JP03/11780

§ 371 (c)(1),
(2), (4) Date: Mar. 2, 2005

(87) PCT Pub. No.: WO2004/044915

PCT Pub. Date: May 27, 2004

(65) Prior Publication Data

US 2006/0064704 A1  Mar. 23, 2006

(30) Foreign Application Priority Data

Nov. 12, 2002  (JP)  ............................. 2002-327701

(51) Int. Cl.
*G11B 17/056* (2006.01)
*G11B 17/04* (2006.01)
*G11B 25/04* (2006.01)

(52) U.S. Cl. ..................... 720/605; 720/690
(58) Field of Classification Search ................. 720/604, 720/605, 689, 690, 613
See application file for complete search history.

(56) References Cited

U.S. PATENT DOCUMENTS

| 5,101,399 | A | * | 3/1992 | Watanabe et al. ............ 720/692 |
| 6,169,720 | B1 | * | 1/2001 | Kamemura et al. ......... 720/605 |
| 6,480,453 | B2 | * | 11/2002 | Ahn ............................ 720/639 |
| 6,782,543 | B2 | * | 8/2004 | Ahn ............................ 720/601 |
| 6,918,130 | B2 | * | 7/2005 | Ariyoshi et al. ............. 720/691 |
| 6,944,872 | B2 | * | 9/2005 | Moriyama et al. ........... 720/690 |
| 7,152,235 | B2 | * | 12/2006 | Matsumoto ................. 720/635 |
| 2001/0010674 | A1 | * | 8/2001 | Ahn ............................ 369/75.2 |
| 2003/0058780 | A1 | | 3/2003 | Shirakawa |
| 2003/0076773 | A1 | * | 4/2003 | Moriyama et al. .......... 369/263 |

FOREIGN PATENT DOCUMENTS

| JP | 5-250685 | A | | 9/1993 |
| JP | 08263910 | A | * | 10/1996 |
| JP | 10106231 | A | * | 4/1998 |
| JP | 2002-93013 | A | | 3/2002 |
| JP | 2003-100043 | A | | 4/2003 |
| JP | 1 313 099 | A2 | | 5/2003 |
| JP | 2003-196951 | A | | 7/2003 |

* cited by examiner

*Primary Examiner*—William J Klimowicz
(74) *Attorney, Agent, or Firm*—Birch, Stewart, Kolasch & Birch, LLP

(57) ABSTRACT

A disk device includes a traverse chassis (20) that supports a turn table (30) or the like, and a main chassis (10) that rotatably supports the traverse chassis (10). The traverse chassis (20) has two coaxial bosses (21*a*, 21*b*). The main chassis (10) has two boss supporting portions (1*a*, 1*b*) that support the bosses (21*a*, 21*b*) of the traverse chassis (20). Protrusions (22*a*, 22*b*) are formed on the tips of the bosses (21*a*, 21*b*). The protrusions (22*a*, 22*b*) abut against the boss supporting portions (1*a*, 1*b*), so as to prevent the deformation of the boss supporting portions (1*a*, 1*b*) in the directions away from each other, with the result that the dropping of the traverse chassis (20) from the main chassis (10) is prevented.

5 Claims, 19 Drawing Sheets

DISK DEVICE

TECHNICAL FIELD

This invention relates to a disk device used for recording and/or reproducing information in a compact disk player or the like, and performs writing and/or reading information on a disk-shaped information recording medium.

BACKGROUND ART

Conventionally, there is known a disk device having a loading mechanism that carries a disk-shaped information recording medium (hereinafter, referred to as a disk medium) between a loading position inside the device and an unloading position outside the device. Such a disk device is disclosed in, for example, Japanese Laid-Open Patent Publication No. 2002-93013 (Page 7, FIGS. 2-4). In such a disk device, a turn table for rotating the disk medium and an optical pickup or the like are mounted on a base (hereinafter, referred to as a middle base) that is movable in vertical direction, in order to prevent the interference with the disk medium being carried.

In such a conventional disk device, a pair of shaft portions are formed at both sides of the middle base, and the shaft portions fit in supporting portions formed on a device base of the disk device. The supporting portions are semi-circular cut-outs that open upward, and the shaft portions fit in the supporting portions from above. Further, urging mechanisms are provided in the vicinities of the supporting portions, which urge the shaft portions so that the shaft portions are not dropped out of the supporting portions. As constructed above, there is a problem that, when the disk device receives an impact caused by the falling of the disk device or the like, the supporting portions or the urging mechanisms may be deformed by the impact, and therefore the shaft portions may be dropped out of the supporting portions, with the result that a whole unit (including the turn table and the optical pickup supported or the like) supported by the middle base may be dropped out of the device base of the disk device.

DISCLOSURE OF INVENTION

An object of the present invention is to provide a disk device capable of preventing the dropping of a unit when the disk device receives an impact caused by the falling or the like.

A disk device according to the invention includes a traverse unit including a turn table that holds and rotates a disk medium, an optical pickup that performs at least one of writing and reading of information on the disk medium and a traverse chassis that supports them, a carrying means that carries the disk medium between a loading position and an unloading position, and a main chassis supporting the traverse unit so that the traverse unit is capable of rotating allowing the traverse unit to move toward and away from the disk media. The traverse chassis has a pair of coaxial rotation shafts for the rotating, and the main chassis has a pair of supporting portions respectively supporting the rotation shafts. The rotation shafts have abutting portions that abut against the supporting portions so as to prevent the deformations of the supporting portions in the directions away from each other.

The deformations of the supporting portions in the directions away from each other are prevented by the abutting portions provided on the respective rotation shafts of the traverse chassis, and therefore the dropping of the rotation shafts out of the supporting portions (due to the deformation of the supporting portions) hardly occurs. Accordingly, it is possible to prevent the traverse unit from being dropped out of the disk device.

Further, a disk device according to the invention includes a traverse unit including a turn table that holds and rotates a disk medium, an optical pickup that performs at least one of writing and reading of information on the disk medium and a traverse chassis that supports them, a carrying mechanism that carries the disk medium between a loading position and an unloading position, and a main chassis supporting the traverse unit so that the traverse unit is capable of rotating allowing the traverse unit to move toward and away from the disk media. The traverse chassis has a pair of coaxial rotation shafts for the rotating, and the main chassis has a pair of supporting portions respectively supporting the rotation shafts. The supporting portions have openings through which the rotation shafts are inserted in the direction substantially parallel to the carrying direction of the disk medium carried by the carrying mechanism.

Since the inserting directions of the rotation shafts into the supporting portions are substantially parallel to the carrying direction of the disk media, it is not necessary to provide openings for the insertion of the rotation shafts in the direction in which the disk device receives the strongest impact (the direction substantially perpendicular to the carrying direction of the disk medium), and therefore the dropping of the rotation shafts out of the openings through the openings hardly occurs. Accordingly, it is possible to prevent the traverse unit from being dropped out of the disk device.

BEST MODE FOR CARRYING OUT THE INVENTION

Hereinafter, the best mode for carrying out the present invention will be described in concrete.

Embodiment 1

Figure 1:
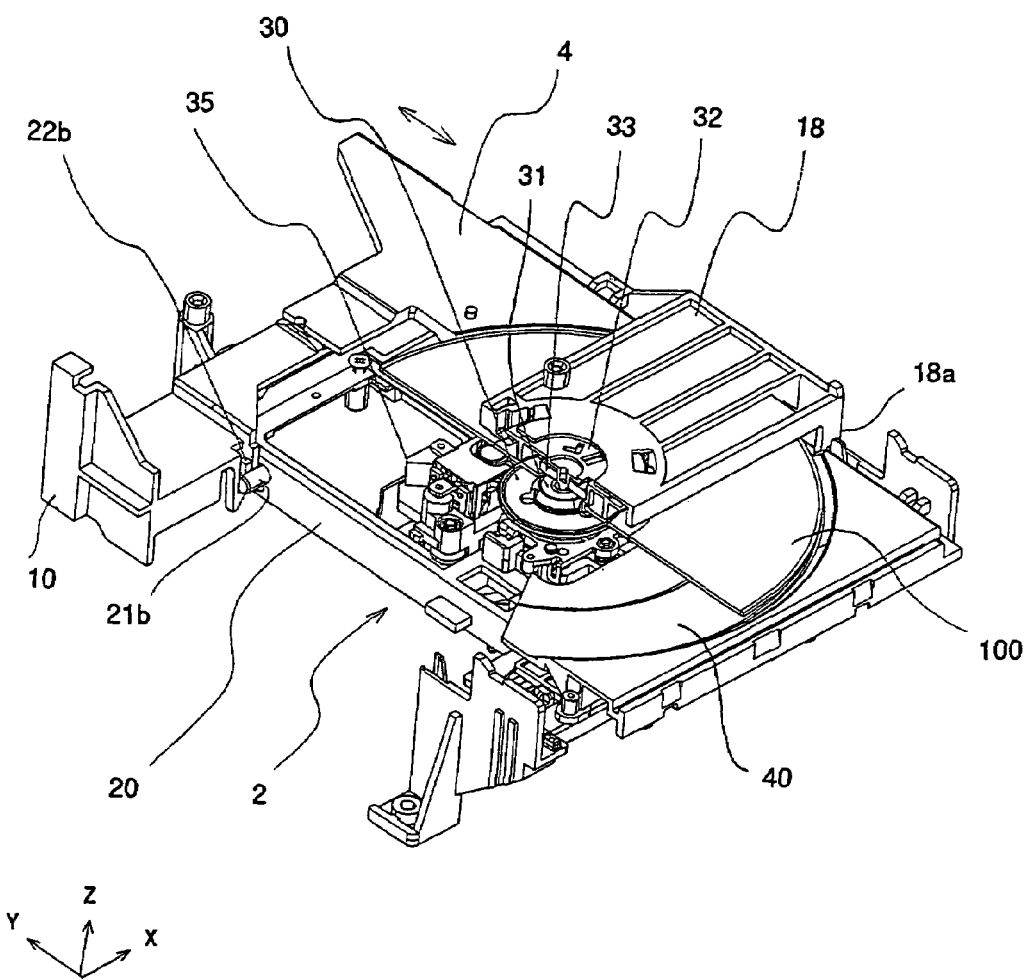
FIG. 1 is a perspective view showing a disk device according to Embodiment 1 of the present invention.

FIG. 1 is a perspective view showing a disk device according to Embodiment 1. The disk device includes a main chassis 10, a traverse chassis 20 rotatably supported by the main chassis 10, and a tray 4 supported by the main chassis 4 so that the tray 4 is able to reciprocate. The tray 4 has a mounting surface 40 horizontally supporting a disk medium 100, and carries the disk medium 100 horizontally between a loading position in the disk device and an unloading position out of the disk device.

Figure 8:
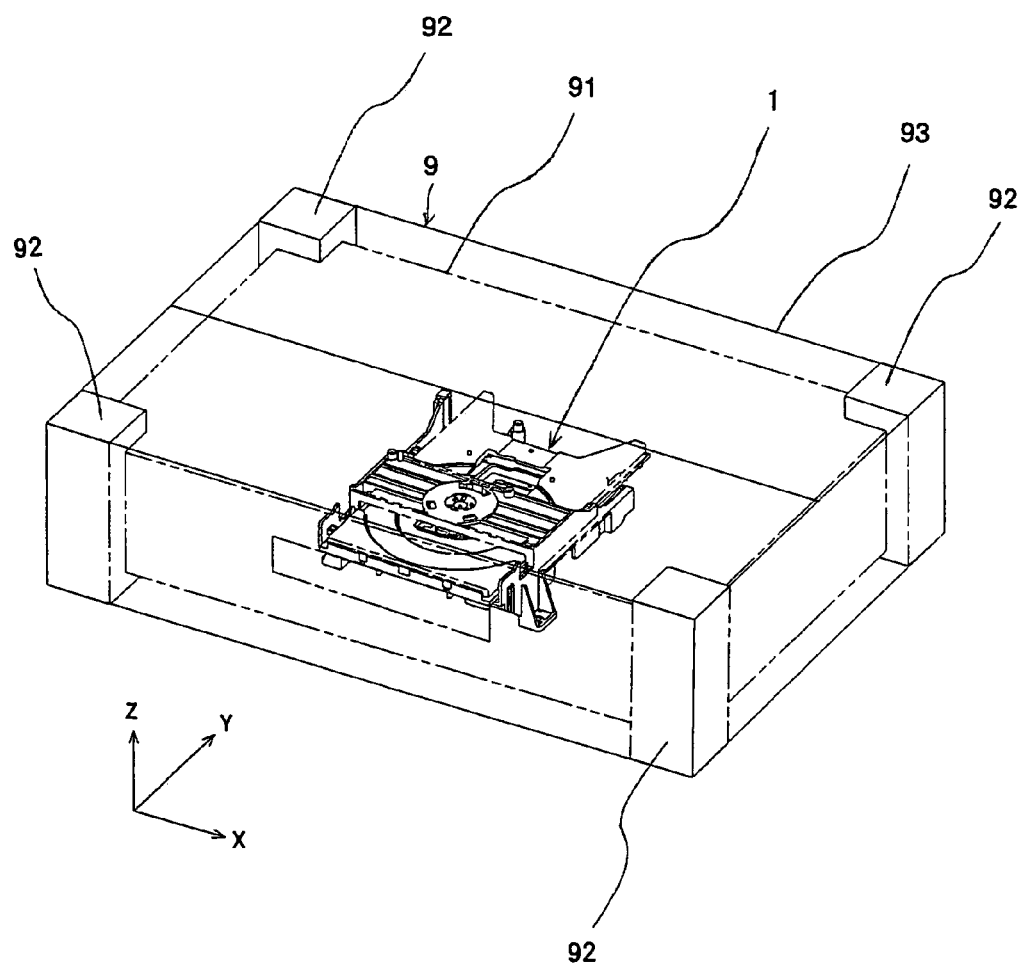
FIG. 8 is a perspective view showing a system on which the disk device according to Embodiment 1 of the present invention is mounted, seen from the positive side of the direction of Z-axis.

Hereinafter, the axis perpendicular to the mounting surface 40 of the tray 4 is defined as Z-axis, and the axis parallel to the moving direction of the tray 4 is defined as Y-axis. The axis perpendicular to Z-axis and Y-axis is defined as X-axis. Along Z-axis, the direction from the tray 4 toward the disk medium 100 is defined as a positive direction, and the opposite direction is defined as a negative direction. Along Y-axis, the moving direction of the tray 4 toward the unloading position is defined as a positive direction, and the opposite direction is defined as a negative direction. Along X-axis, the direction toward the upper-right in FIG. 1 is defined as a positive direction, and the direction toward the lower-left is defined as a negative direction. In FIG. 1 and FIG. 8 (described later) are illustrated in such a manner that the positive side of Z-axis is directed upward. This corresponds to the attitude of the disk device when the disk device is mounted in a system 9 (FIG. 8) such as a compact disk player or the like. The other figures are illustrated in such a manner that the negative side of Z-axis is directed upward. This corresponds to the attitude of the disk device during the mounting operation of the traverse chassis 20 to the main chassis 10.

A turn table 30 is provided on the traverse chassis 20. The turn table 30 is fixed to a rotation shaft of a not shown motor attached to the traverse chassis 20. A ring-shaped metal plate 31 is fixed to an upper end surface of the turn table 30. A clamp plate 18 is disposed on a side opposite to the main chassis 10 with respect to the tray 4. The clamp plate 18 is fixed to the main chassis 10 via two leg portions 18a (only one of which is shown in FIG. 1) formed at both ends of the clamp plate 18 in the direction of X-axis. A damper 32 is mounted on the center portion of the clamp plate 18 in the direction of X-axis. The damper 32 and the turn table 30 hold the disk medium 100 therebetween. The damper 32 has a magnet 33 in the inside thereof for magnetically adsorbing the ring-shaped metal plate 31 of the turn table 30.

An optical pickup 35 is mounted on the traverse chassis 20 so that the optical pickup 35 faces the surface of the disk medium 100. The optical pickup 35 is provided for writing information on the disk medium 100, reading information from the disk medium 100 or both. The pickup 35 is driven by a not shown pickup driving mechanism provided on the traverse chassis 20, and moves along the radial direction of the disk medium 100. The traverse chassis 20, the turn table 30, the optical pickup 35 and the pickup driving mechanism constitute a traverse unit 2.

Figure 2:
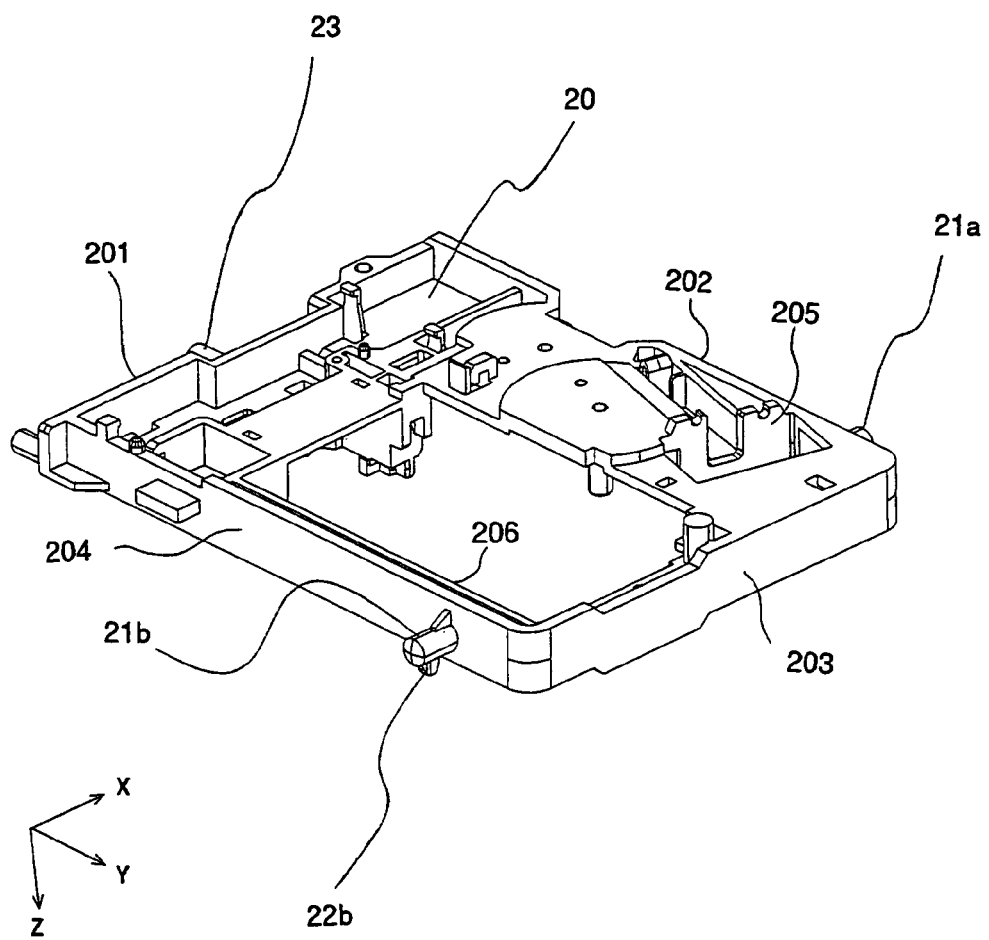
FIG. 2 is a perspective view showing a traverse chassis of the disk device according to Embodiment 1 of the present invention.
Figure 3:
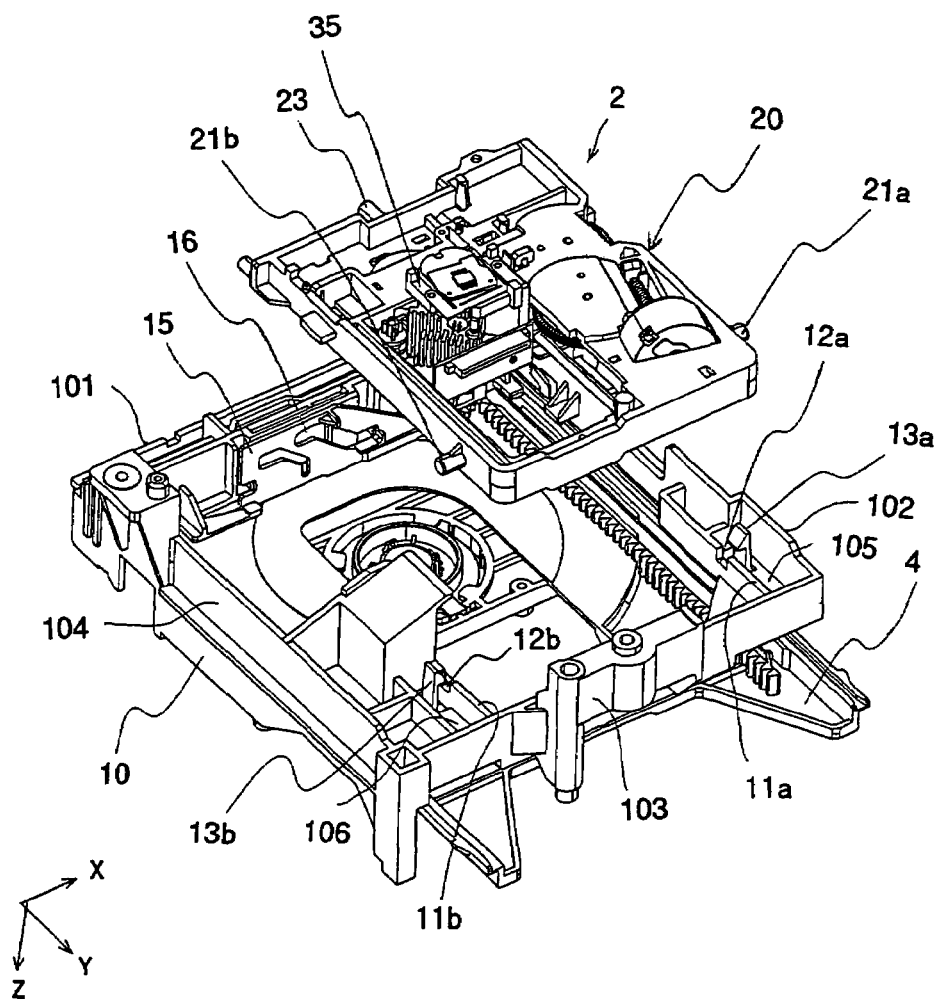
FIG. 3 is a perspective view showing a condition in which the traverse unit is removed from the disk device according to Embodiment 1 of the present invention.
Figure 4:
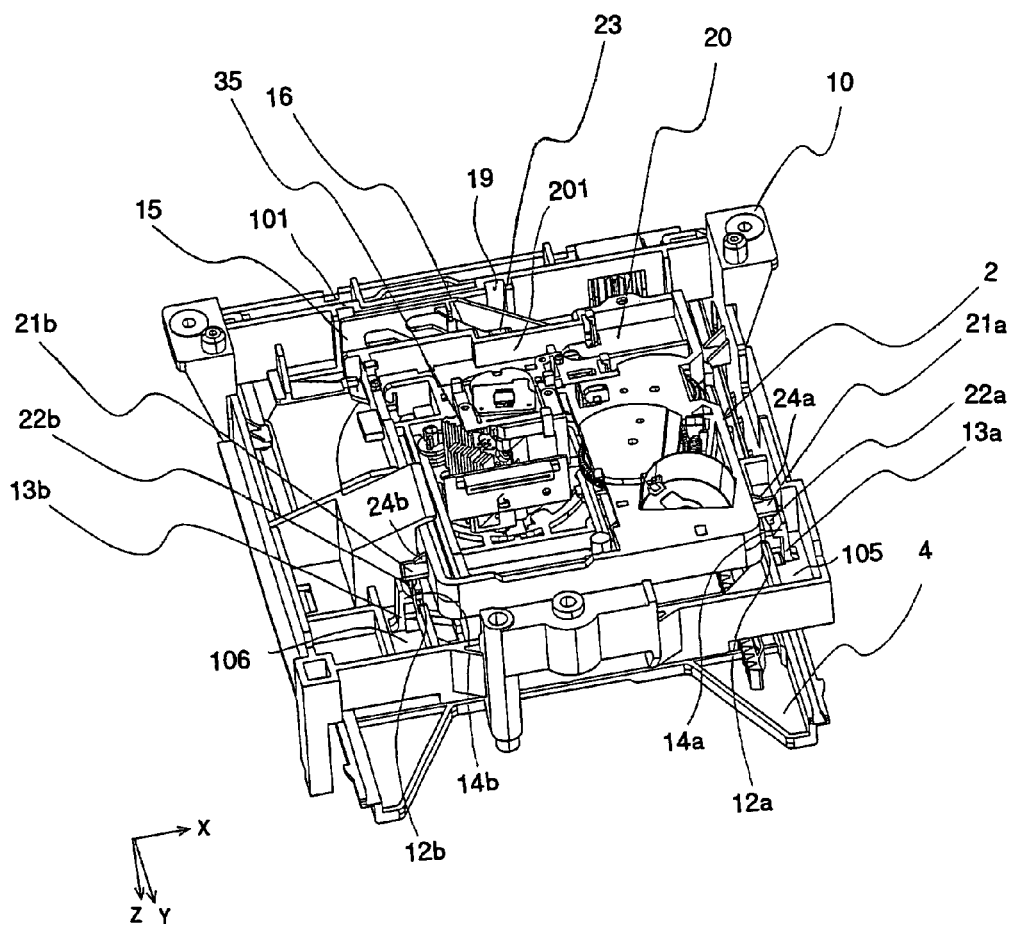
FIG. 4 is a perspective view showing a condition immediately before the traverse unit is mounted on the disk device according to Embodiment 1 of the present invention.
Figure 5:
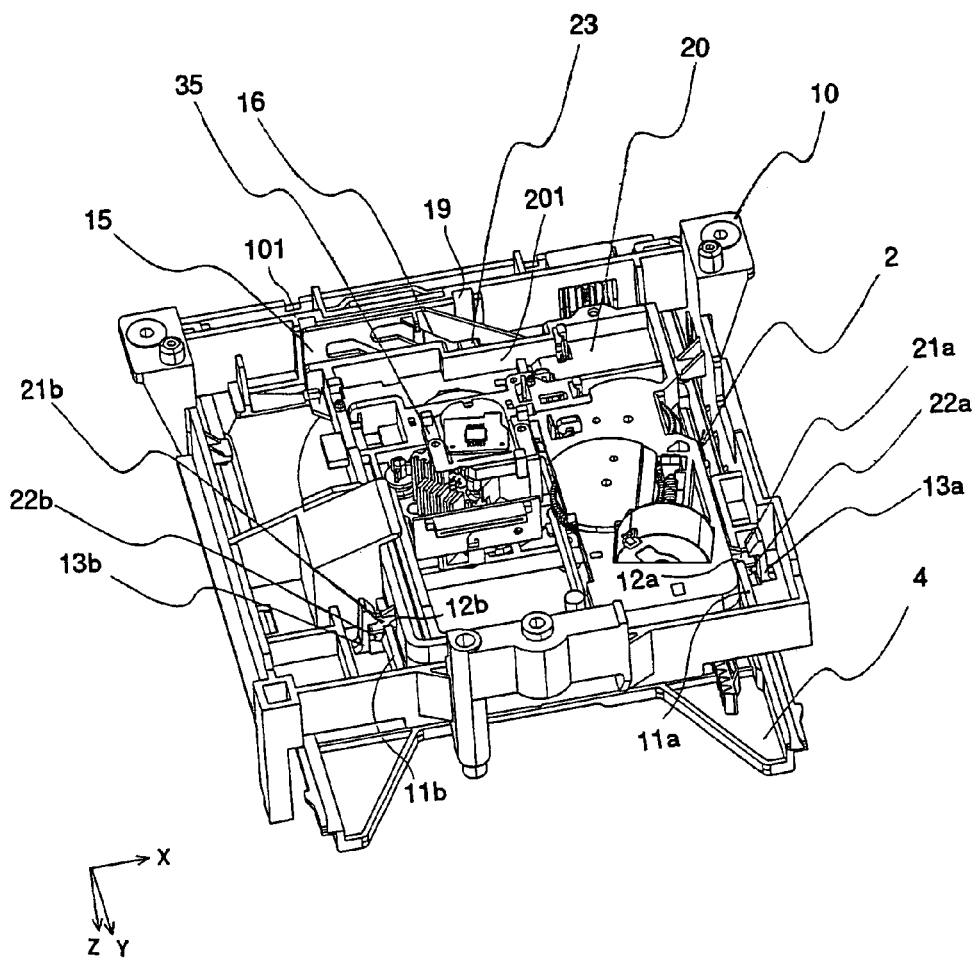
FIG. 5 is a perspective view showing the disk device according to Embodiment 1 of the present invention.
Figure 6:
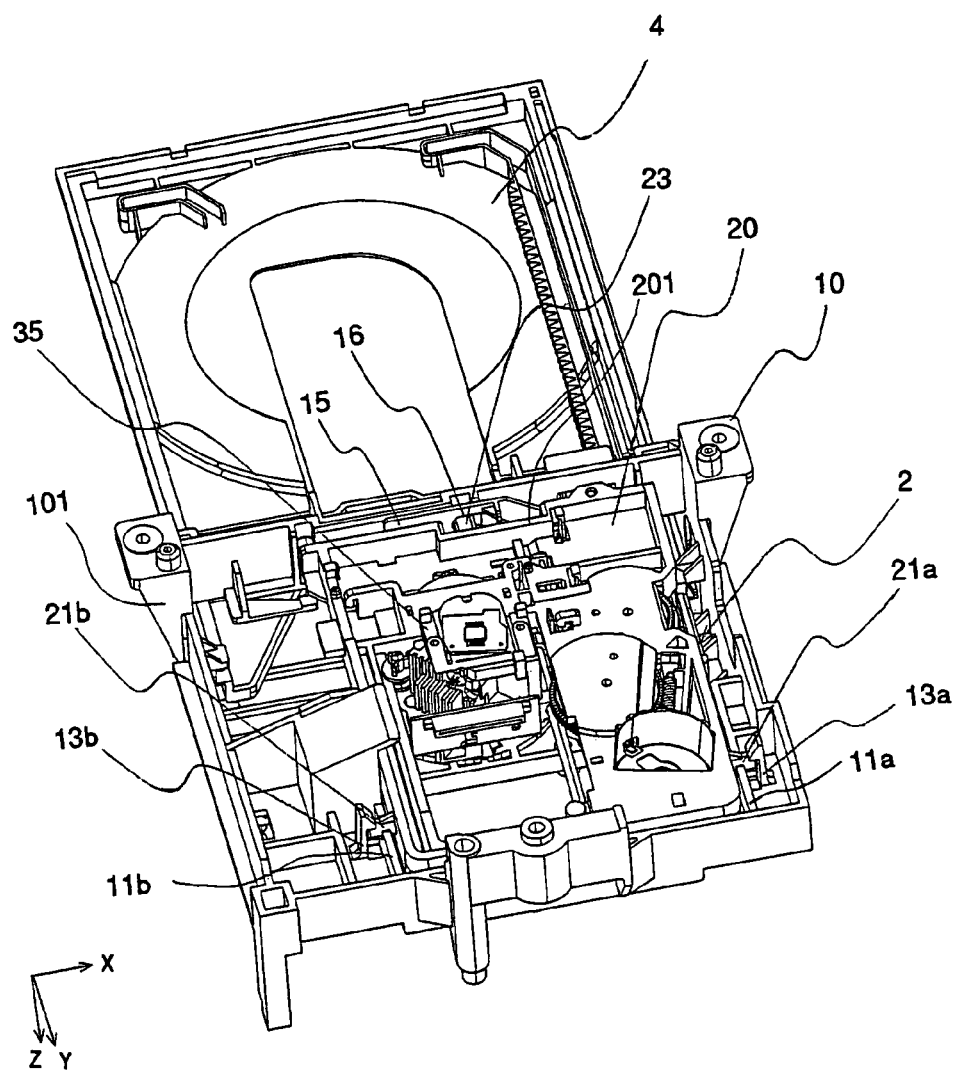
FIG. 6 is a perspective view showing a condition in which a tray is in an unloading position of the disk device according to Embodiment 1 of the present invention.
Figure 7:
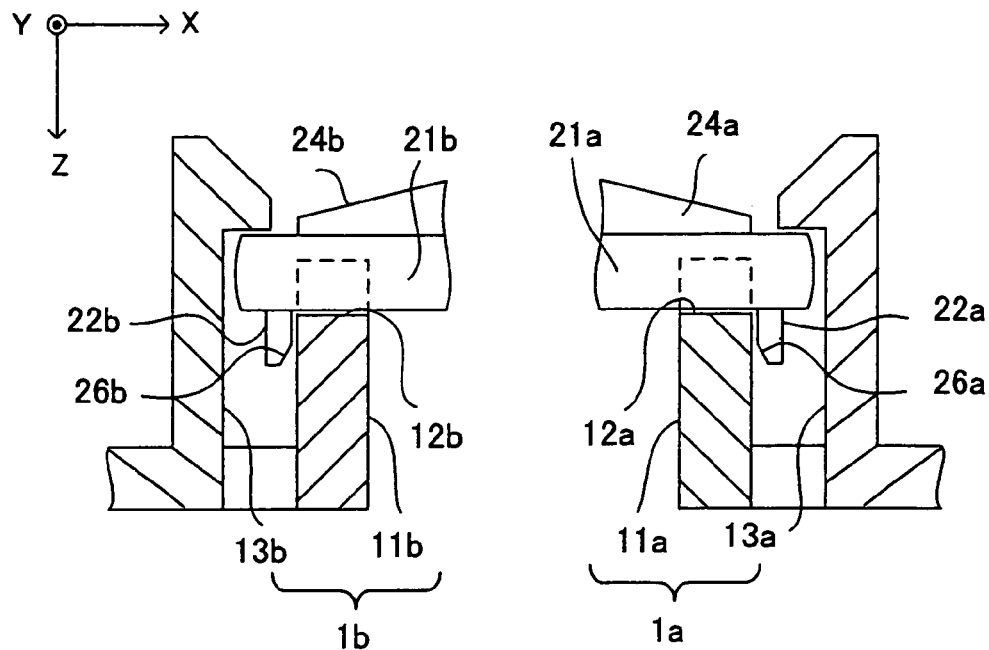
FIGS. 7(*a*) and 7(*b*) are schematic views showing an advantage obtained by the disk device according to Embodiment 1 of the present invention.
Figure 7:
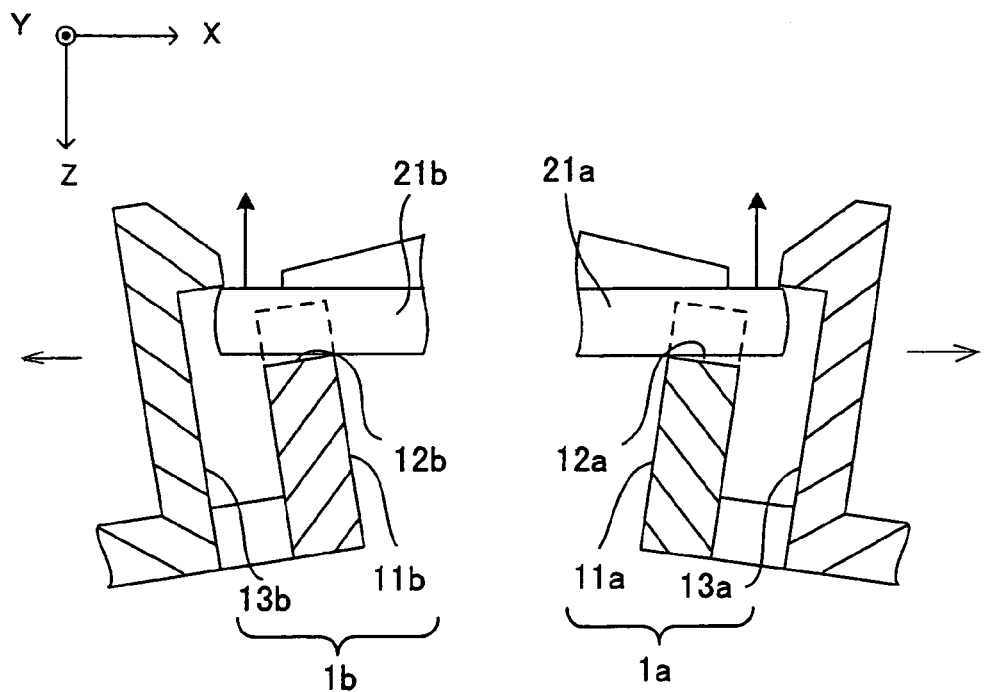

FIGS. 2 to 6 are perspective views illustrated in such a manner that the negative side of Z-axis is directed upward and the positive side of Y-axis is directed to the lower-right. FIG. 2 shows the traverse chassis 20. FIG. 3 shows the disk device from which the traverse unit 2 is detached. FIG. 4 shows the disk device immediately before the traverse unit 2 is mounted on the disk device. FIG. 5 shows the disk device on which the traverse unit 2 is mounted. FIG. 7 is a schematic view schematically showing the advantage of the disk device according to Embodiment 1 in such a manner that the negative side of Z-axis is directed upward and the positive side of X-axis is directed to the right.

As shown in FIG. 2, the traverse chassis 20 has a rectangular shape seen in the direction of Z-axis. The traverse chassis 20 includes outer walls 201 and 203 extending in the direction of X-axis, and outer walls 202 and 204 perpendicular to the outer walls 201 and 203. A mounting portion 205 for mounting the respective driving systems, a recess 206 (for mounting the optical pickup 35 and the not-shown pickup driving mechanism) and the like are formed in a region surrounded by the outer walls 201 through 204. Bosses 21a and 21b are respectively formed in the vicinities of the ends of the outer walls 202 and 204 on the positive side of Y-axis. The bosses 21a and 21b project outward in the direction of X-axis from the outer walls 202 and 204 so that the bosses 21a and 21b are coaxial with each other. As shown in FIGS. 4 and 7, protrusions 22a and 22b are formed in the vicinities of the tips of the bosses 21a and 21b. The protrusions 22a and 22b protrude in the positive direction of Z-axis. Reinforcement plates 24a and 24b are formed in the vicinities of the roots of the boss 22a and 22b.

As shown in FIG. 3, the main chassis 10 has a rectangular shape seen in the direction of Z-axis, and includes outer walls 101 and 103 extending in the direction of X-axis and outer walls 102 and 104 extending in the direction of Y-axis. A pair of side walls 11a and 11b are formed within the outer walls 102 and 104, and extend in the negative direction of Y-axis from the side wall 103. A top plate 105 is formed between the side wall 11a and the outer wall 102, and a top plate 106 is formed between the side wall 11b and the outer wall 104.

Groove portions 12a and 12b are formed on the side walls 11a and 11b at positions corresponding to the bosses 21a and 21b. The groove portions 12a and 12b support the bosses 21a and 21b of the traverse chassis 20. The groove portions 12a and 12b are rectangular cutouts that open in the negative direction of Z-axis so that the bosses 21a and 21b are inserted into the groove portions 12a and 12b. As shown in FIG. 5, when the bosses 21a and 21b are inserted into the groove portions 12a and 12b, the protrusions 22a and 22b formed at the tips of the bosses 21a and 21b face the outer surface of the side walls 11a and 11b in the direction of X-axis, so that the protrusions 22a and 22b are able to abut against the outer surfaces of the side walls 11a and 11b.

As shown in FIG. 4, resilient claws 13a and 13b are disposed on the outer sides of the groove portions 12a and 12b in the direction of X-axis. The resilient claws 13a and 13b are elongated members respectively extending from the top plates 105 and 106 in the negative direction of Z-axis. Projections 14a and 14b are formed on the tip portions of the resilient claws 13a and 13b, and project inwardly in the direction of X-axis. The projections 14a and 14b hold the bosses 21a and 21b so that the bosses 21a and 21b are not dropped out of the groove portions 12a and 12b. Surfaces of the projections 14a and 14b facing each other are so inclined that positions along the surfaces inwardly project (in the direction of X-axis) as the positions shift in the position direction of Z-axis. Horizontal surfaces are formed on the positive sides of the inclined surfaces of the projections 14a and 14b in the direction of Z-axis. The horizontal surfaces are parallel to XY-plane, and are directed in the positive direction of Z-axis. During the insertion of the bosses 21a and 21b into the groove portions 12a and 12b, the bosses 21a and 21b abut against the inclined surfaces of the projections 14a and 14b, so that the resilient claws 13a and 13b are resiliently deformed in the directions away from each other. As the bosses 21a and 21b pass through the projections 14a and 14b and are inserted into the groove portions 12a and 12b, the resilient claws 13a and 13b return to their original states, so that the bosses 21a and 21b are held in the groove portions 12a and 12b by the above described horizontal surfaces of the projections 14a and 14b. The side wall 11a, the groove portion 12a and the resilient claw 13a correspond to a boss supporting portion 1a (FIG. 7). The side wall 11b, the groove portion 12b and the resilient claw 13b correspond to a boss supporting portion 1b (FIG. 7).

A cam pin 23 is formed on the outer wall 201 of the traverse chassis 20. A cam member 15 having a cam groove 16 that engages the cam pin 23 of the traverse chassis 20 is disposed on the inner side of the outer wall 101 of the main chassis 10. The cam member 15 reciprocates in the direction of X-axis by a not-shown cam driving mechanism. As the cam member 15 moves, the cam pin 23 moves in the direction of Z-axis, causing the traverse chassis 20 to rotate about the bosses 21a and 21b. The cam pin 23 does not only engage the cam groove 16 but also engages a positioning groove 19 formed on the main chassis 10 (and elongated in the direction of Z-axis) so as to determine the position of the traverse chassis 20 in the direction of X-axis.

The rotation of the traverse chassis 20 is performed to avoid the interference of the turn table 30 and the optical pickup 35 with the tray 4 (and the carried disk medium 100) that horizontally moves in XY-plane. When the traverse chassis 20 is parallel to XY-plane, the turn table 30 is able to engage the center portion of the disk medium 100, and the optical pickup 35 faces the surface of the disk medium 100. Conversely, as shown in FIG. 6, when the tray 4 carries the disk medium 100, the traverse chassis 20 is inclined with respect to XY-plane. In this state, the turn table 30 and the optical pickup 35 move downward away from the movable area of the tray 4 and the disk medium 100.

Next, the operation of the above constructed disk device will be described. In a state before the disk medium 100 is inserted into the disk device, the traverse unit 2 is inclined with respect to XY-plane. When the disk medium 100 is to be inserted into the disk device, the tray 4 is moved by a not-shown loading mechanism to the unloading position out of the disk device as shown in FIG. 6. Then, after the user puts the disk medium 100 on the tray 4, the tray 4 moves from the unloading position to the loading position in the disk device.

Then, the cam member 15 is moved by the not shown cam driving mechanism, so that the traverse chassis 20 rotates about the bosses 21a and 21b until the traverse chassis 20 is parallel to XY-plane (FIGS. 1 and 5). Then, as shown in FIG. 1, the turn table 30 engages the center portion of the disk medium 100 held by the tray 4. The turn table 30 and the clamper 32 clamp the disk medium 100 therebetween by means of the magnetic adsorbing force between ring-shaped metal plate 31 and the magnet 33. As the disk medium 100 is rotated by the turn table 30, the optical pickup 35 is moved by the not-shown pickup driving mechanism between the outermost track and the innermost track of the disk medium 100, so as to perform writing information on the disk medium 100, reading information on the disk medium 100 or both.

When the disk medium 100 is to be unloaded out of the disk device, the traverse chassis 20 rotates about the bosses 21a and 21b by the movement of the cam member 15, so that the traverse chassis 20 is inclined to XY-plane. The turn table 30 and the optical pickup 35 supported by the traverse chassis 20 move downward away from the disk medium 100. Then, the tray 4 moves to the unloading position as shown in FIG. 6. After the user takes the disk medium 100 from the tray 4, the tray 4 moves into the disk device.

Next, the advantage obtained by Embodiment 1 will be described. First, the impact that the disk device receives during the transportation will be described. FIG. 8 is a perspective view showing a system 9 such as a compact disk player in which the disk device (denoted by numeral 1 in FIG. 8) is mounted, in a state where the system 9 is packaged. FIG. 8 is illustrated in such a manner that the positive side of Z-axis is directed upward, and the positive side of X-axis is directed to the lower-right. The system 9 has a substantially rectangular parallelepiped housing 91. The housing 91 is accommodated in a package 93 made of corrugated board in such a manner that four corners of the housing 91 in XY-plane are supported by cushions 92 as shock absorbers.

Figure 9:
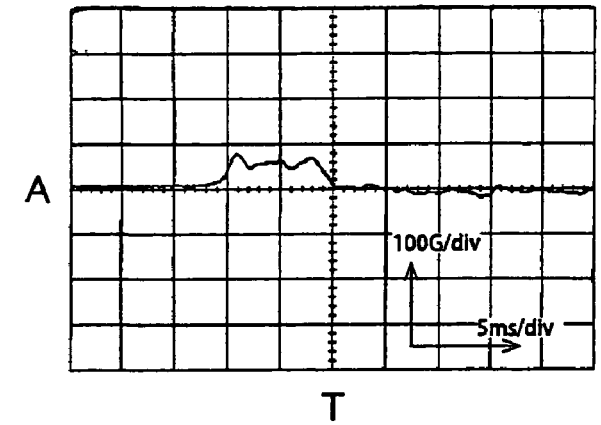
FIGS. 9(*a*), 9(*b*) and 9(*c*) are views showing examples of measured impact acceleration when the disk device according to Embodiment 1 of the present invention falls.
Figure 9:
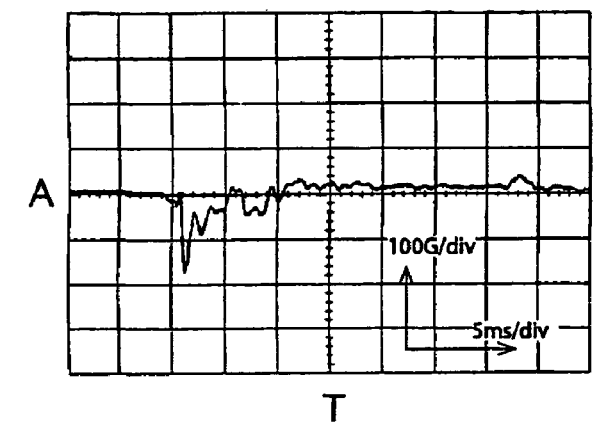
Figure 9:
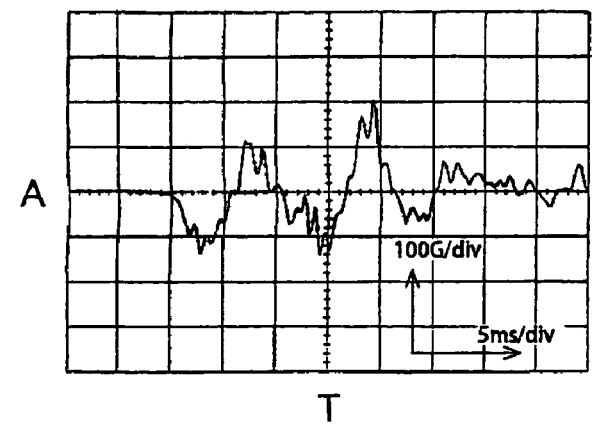

FIG. 9 is a view showing an acceleration (referred to as an impact acceleration) of the disk device when the packaged system 9 as shown in FIG. 8 freely falls from the height of 90 cm onto the surface of the concrete. FIGS. 9(a), 9(b) and 9(c) respectively show the measured values of the impact accelerations when the disk device falls in the positive direction of X-axis, the positive direction of Y-axis, and the negative direction of Z-axis. In FIGS. 9(a) through 9(c), the vertical axis indicates an impact acceleration (A), and the horizontal axis indicates an elapsed time (T). If the disk device falls in the negative direction of X-axis, the negative direction of Y-axis, and the positive direction of Z-axis, the waveforms of reversed polarities (positive/negative) with respect to those shown in FIGS. 9(a), 9(b) and 9(c) are obtained. It is known that the dropping and the damage of parts caused by the falling of the disk device or the like depend on the impact acceleration or the impact energy (i.e., the product of the impact acceleration and the duration of the impact). As shown in FIGS. 9(a) through 9(c), the impact acceleration and the impact energy show their maximum values when the disk device falls in the direction of Z-axis. This is because the impact acceleration and the impact energy are considered to have dependence on a surface area of the housing 91 that faces the ground contact area when the disk device falls on the ground. This tendency is commonly observed in general systems in which the disk devices are incorporated. As a result, it is understood that it is necessary to improve the resistance of the disk device to impact in the direction of Z-axis.

In consideration on these results, the advantage of Embodiment 1 will be described. FIG. 7(a) is a schematic view for explaining the advantage of Embodiment 1. FIG. 7(b) is a schematic view for explaining the comparative example as opposed to Embodiment 1, i.e., the case in which the bosses 21a and 21b have no protrusion 22a and 22b. When the disk device falls in the direction of Z-axis, the impact corresponding to several tens times the weight of the traverse unit 2 is applied to the boss supporting portions 1a and 1b. If the bosses 21a and 21b abut against the resilient claws 13a and 13b with such an impact, the boss supporting portion 1a (the side wall 11a, the groove portion 12a and the resilient claw 13a) and the boss supporting portion 1b (the side wall 11b, the groove portion 12b and the resilient claw 13b) are going to be resiliently deformed in the directions away from each other as shown in FIG. 7(b). However, according to Embodiment 1, as shown in FIG. 7(a), the resilient deformations of the whole boss supporting portions 1a and 1b are prevented by the protrusion 22a and 22b of the traverse chassis 2, even if the resilient claws 13a and 13b are resiliently deformed. Since the resilient deformation of the whole boss supporting portions 1a and 1b is prevented, the bosses 21a and 21b resist being dropped out of the groove portions 12a and 12b. As a result, the traverse unit 2 resist being dropped out of the main chassis 10, and therefore the resistance to impact is enhanced.

Tapered surfaces 26a and 26b are formed on facing sides of the tips of the protrusions 22a and 22b. The tapered surfaces 26a and 26b guide the protrusions 22a and 22b toward the positions outside the side walls 11a and 11b when the bosses 21a and 21b are inserted into the groove portions 12a and 12b.

As described above, according to the disk device according to Embodiment 1, the traverse unit 2 resists being dropped out of the main chassis 10, and the resistance to impact can be enhanced. Particularly, the protrusion 22a and 22b provided on the bosses 21a and 21b prevent the resilient deformation of the boss supporting portions 1a and 1b, and therefore the structure for preventing the resilient deformation can be simplified. Moreover, because of the provision of the resilient claws 13a and 13b, the dropping of the bosses 21a and 21b out of the groove portions 12a and 12b can be prevented, and the insertion of the bosses 21a and 21b into the groove portions 12a and 12b can be easily performed. Particularly, the bosses 21a and 21b can be inserted into the groove portions 12a and 12b of the main chassis 10 in the direction of Z-axis, and therefore the disk device can be easily assembled.

Embodiment 2

Figure 10:
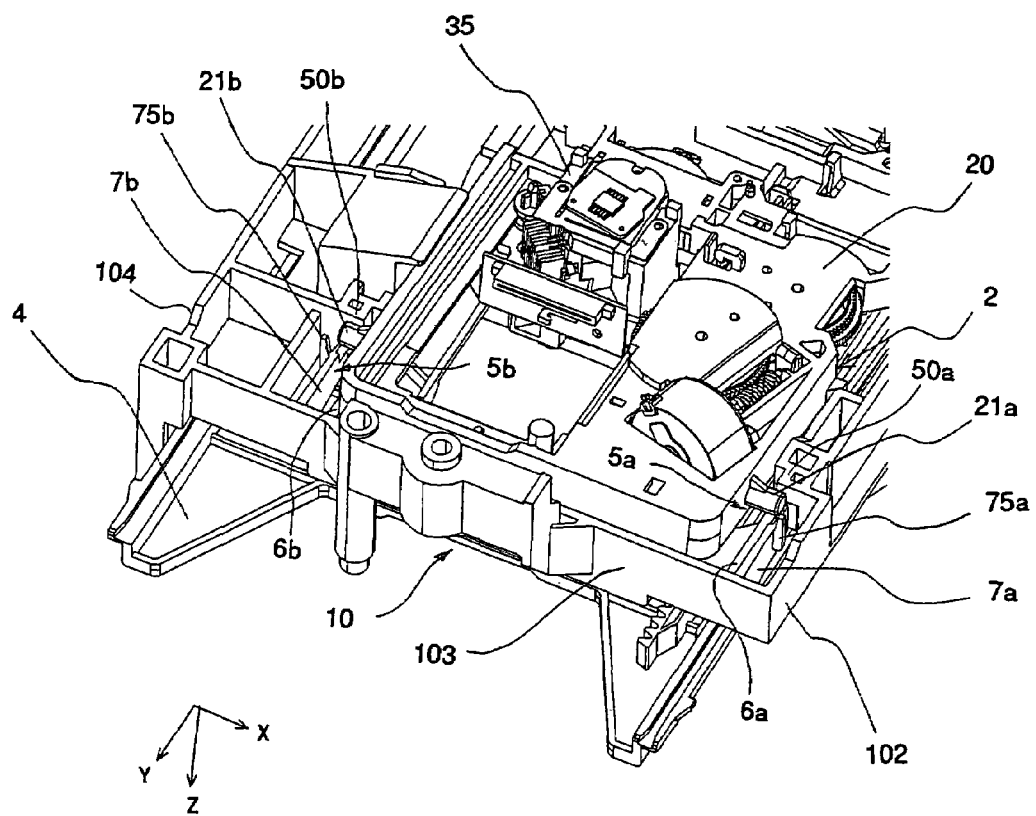
FIG. 10 is a perspective view showing a condition immediately before the traverse unit is mounted on a disk device according to Embodiment 2 of the present invention.
Figure 11:
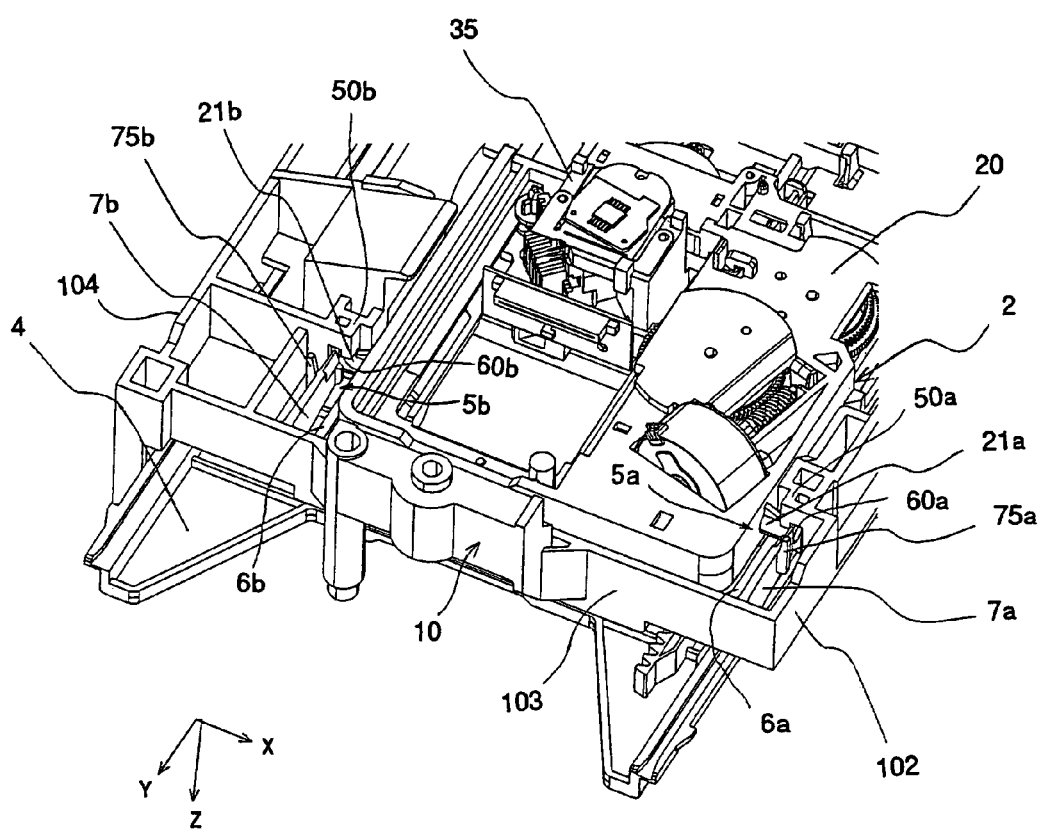
FIG. 11 is a perspective view showing the disk device according to Embodiment 2 of the present invention.

FIGS. 10 and 11 are perspective views illustrated in such a manner that the negative side of Z-axis is directed upward and the positive side of Y-axis is directed to the lower-left. FIG. 10 shows the disk device according to Embodiment 2 immediately before the traverse unit 2 is mounted on the disk device. FIG. 11 shows the condition in which the traverse unit 2 is mounted on the disk device.

As shown in FIGS. 10 and 11, in the main chassis 10, boss supporting portions 5a and 5b are formed on the outer sides of the traverse chassis 20 in the direction of X-axis. The boss supporting portions 5a and 5b support bosses 21a and 21b of the traverse chassis 20. The boss supporting portions 5a and 5b respectively include side walls 6a and 6b extending in the direction of Y-axis from the outer wall 103 of the main chassis 10. The side walls 6a and 6b have horizontal end surfaces (parallel to XY-plane) directed in the negative direction of Z-axis. Blocks 50a and 50b are formed on outer sides of the side walls 6a and 6b in the direction of X-axis. The blocks 50a and 50b project inwardly in the direction of X-axis from the outer walls 102 and 104.

Figure 12:
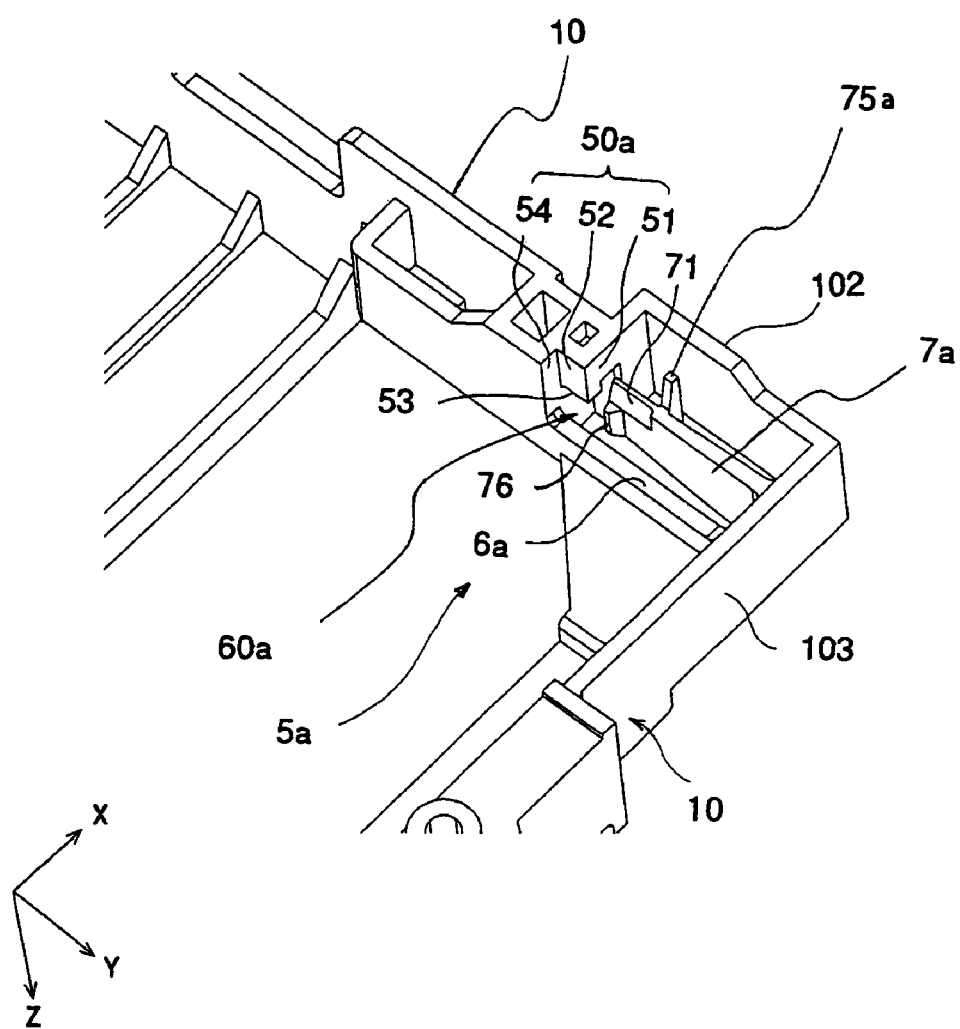
FIG. 12 is a perspective view showing a boss supporting portion of the disk device in an enlarged scale, according to Embodiment 2 of the present invention.

FIG. 12 is a perspective view showing one boss supporting portion of the disk device in an enlarged scale, in such a manner that the negative side of Z-axis is directed upward and the positive side of Y-axis is directed to the lower-right. As shown in FIG. 12, the block 50a of the boss supporting portion 5a has a vertical surface 51 that faces the outer wall 103 of the main chassis 10, a vertical surface 52 in parallel to the outer wall 102, and the horizontal surface 53 formed on the positive side of the vertical surfaces 51 and 52 in the direction of Z-axis. In the direction of Z-axis, a space larger than the diameter of the boss 21a is formed between the horizontal surface 53 and the side wall 6a. Further, the block 50a has a vertical surface 54 adjacent to the side wall 6a in the negative direction of Y-axis, and the vertical surface 54 faces the outer wall 103. The position of the boss 21a in the direction of Z-axis is defined by the horizontal surface 53 of the block 50a and the horizontal end surface of the side wall 6a. Further, the position of the negative side of the boss 21a in the direction of Y-axis is defined by the vertical surface 54 of the block 50a. The portion surrounded by the horizontal surface 53, the vertical surface 54 and the horizontal end surface of the side wall 6a constitute a groove portion 60a into which the boss 21a is inserted.

A resilient claw 7a, which is an elongated member, extends in the direction of Y-axis from the outer wall 103 of the main chassis 10 to the groove portion 60a. The resilient claw 7a is able to be resiliently deformed with one end thereof being fixed to the outer wall 103. The resilient claw 7a has an tip end surface that faces the vertical surface 54 of the block 50a. The tip end surface of the resilient claw 7a holds the boss 21a in the groove portion 60a and regulates the position of the boss 21a in the direction of Y-axis. A tapered surface 71 is formed on a tip portion of the resilient claw 7a so that the tapered surface 71 contacts the boss 21a when the boss 21a is urged against the resilient claw 7a in the direction of Z-axis. By urging the boss 21a against the tapered surface of the resilient claw 7a in the direction of Z-axis, the resilient claw 7a is resiliently deformed in the direction toward the outer wall 102.

A pin 75a is formed on the side of the resilient claw 7a facing the outer wall 102, and extends in the direction of Z-axis. If the resilient deformation of the resilient claw 7a is not sufficient when the boss 21a is urged against the tapered surface 71, the operator is able to resiliently deform the resilient claw 7a by pushing the pin 75a with a finger or the like. Further, a projection 76 is formed on the tip portion of the resilient claw 7a, and projects in the direction opposite to the outer wall 102. The projection 76 is provided for causing the boss 21a to resist being dropped out of the groove portion 60a in the direction of Y-axis.

The other boss supporting portion 5b (not shown in FIG. 12) is so constructed that the boss supporting portions 5a and 5b are symmetrical to each other with respect to the center portion of the main chassis 10 in the direction of X-axis. As shown in FIG. 11, the boss supporting portion 5b supports the boss 21b in a groove portion 60b constituted by a side wall 6b and a block 50b, and regulates the position of the boss 21b by means of a resilient claw 7b.

In Embodiment 2, the bosses 21a and 21b of the traverse chassis 20 has no projection 22a and 22b described in Embodiment 1. The other structure is the same as that of Embodiment 1.

When the bosses 21a and 21b are to be inserted into the boss supporting portions 5a and 5b, the bosses 21a and 21b are urged against the respective tapered surfaces 71 (FIG. 12) of the resilient claws 7a and 7b in the direction of Z-axis, so that the resilient claws 71 and 72 are resiliently deformed in the directions way from each other. When the bosses 21a and 21b abut against the side walls 6a and 6b, the bosses 21a and 21b are moved in the negative direction of Y-axis. The bosses 21a and 21b move beyond the respective projections 76 (FIG. 12) of the resilient claws 7a and 7b, and are inserted into the groove portions 60a and 60b as shown in FIG. 11. The direction in which the bosses 21a and 21b are inserted into the groove portions 60a and 60b is the direction of Y-axis. As the bosses 21a and 21b are inserted into the groove portions 60a and 60b, the resilient claws 7a and 7b return to their original states before resilient deformation. In this state, the positions of the bosses 21a and 21b in the direction of Y-axis are regulated by the respective vertical surfaces 54 (FIG. 12) of the blocks 50a and 50b and the respective tip end surfaces of the resilient claws 7a and 7b. The positions of the bosses 21a and 21b in the direction of Z-axis are regulated by the respective horizontal end surfaces of the resilient claws 7a and 7b and the respective horizontal surfaces 53 (FIG. 12) of the blocks 50a and 50b.

When the disk device receives an impact in the direction of Z-axis caused by the falling or the like, the impact corresponding to several tens times the weight of the traverse unit 2 is applied to the boss supporting portions 5a and 5b, as was described in Embodiment 1. However, in Embodiment 2, the direction in which the bosses 21a and 21b are inserted into the boss supporting portions 5a and 5b is the direction of Y-axis, which is different from the direction in which the disk device receives the maximum impact. Therefore, the bosses 21a and 21b resist being dropped out of the boss supporting portions 5a and 5b. In other words, the positions of the bosses 21a and 21b in the direction of Z-axis are regulated by the blocks 50a and 50b and the side walls 6a and 6b that are not deformed easily, and therefore the bosses 21a and 21b resist being dropped out of the boss supporting portions 5a and 5b.

As constructed above, according to Embodiment 2, the bosses 21a and 21b resist being dropped out of the boss supporting portions 5a and 5b, so that the resistance to impact is further enhanced. Moreover, when the bosses 21a and 21b are inserted into the boss supporting portions 5a and 5b, it is possible to move the bosses 21a and 21b along the resilient claws 7a and 7b into the groove portions 60a and 60b, and therefore the insertion of the bosses 21a and 21b becomes easy.

Embodiment 3

Figure 13:
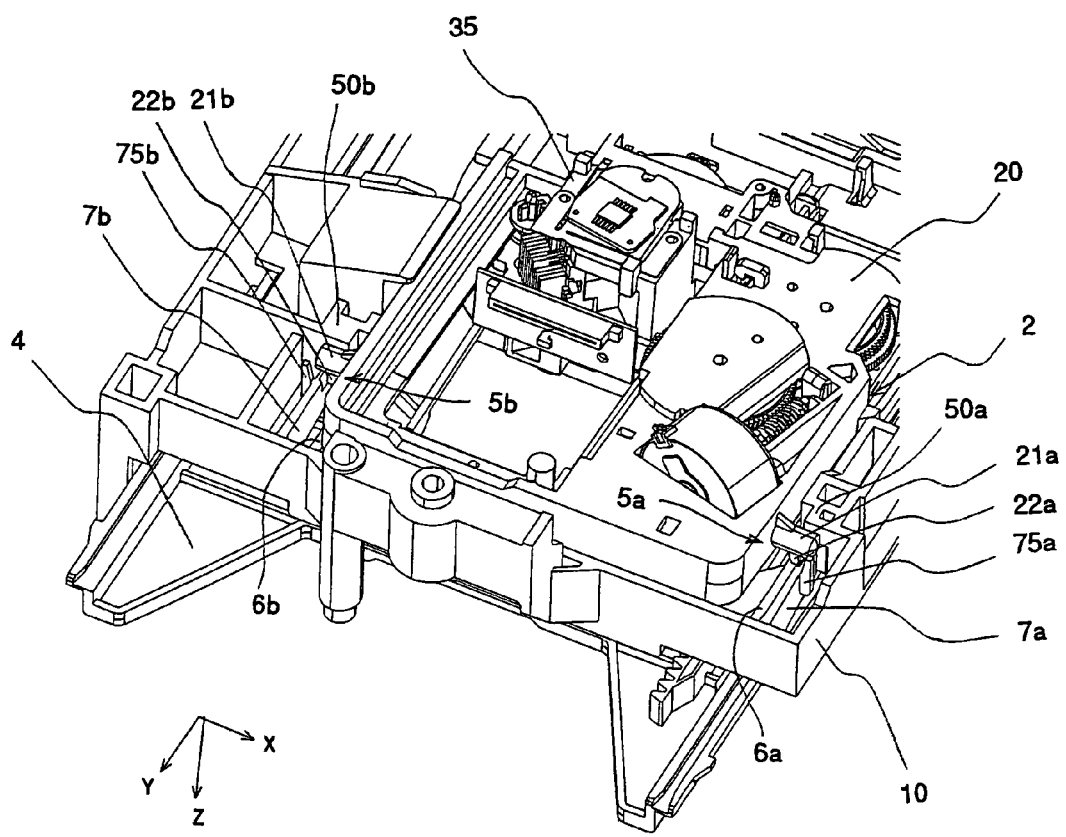
FIG. 13 is a perspective view showing a condition immediately before the traverse unit is mounted on a disk device according to Embodiment 3 of the present invention.
Figure 14:
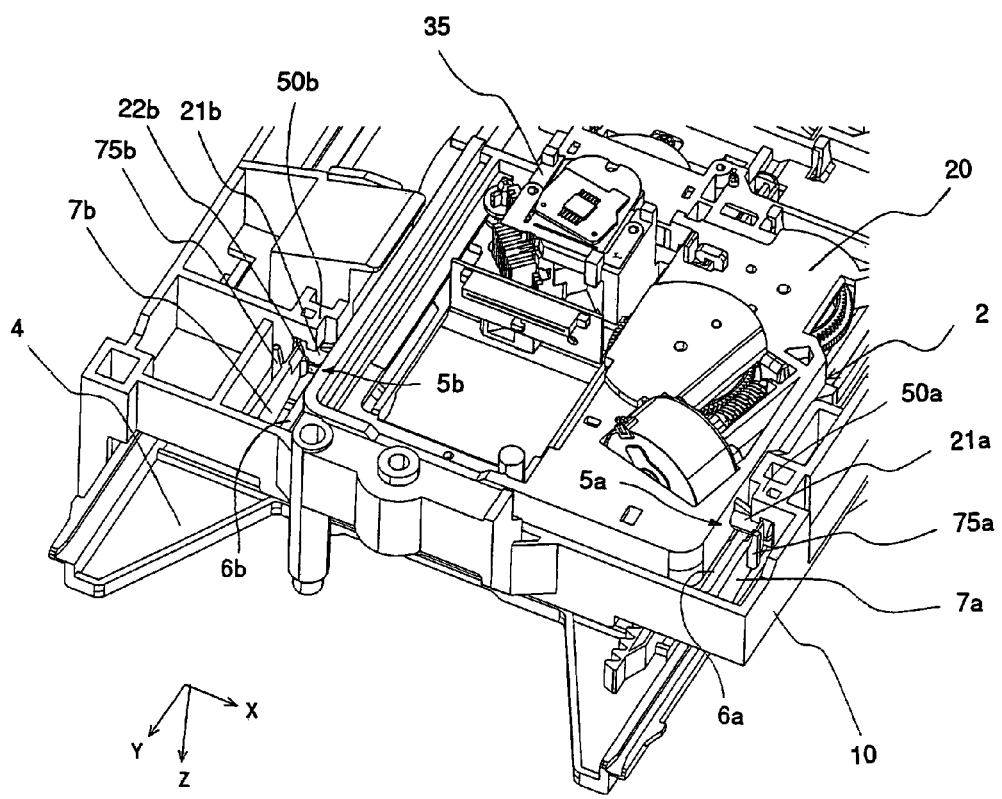
FIG. 14 is a perspective view showing the disk device according to Embodiment 3 of the present invention.

FIGS. 13 and 14 are perspective views illustrated in such a manner that the negative side of Z-axis is directed upward and the positive side of Y-axis is directed to the lower-left. FIG. 13 shows the condition immediately before the traverse unit 2 is mounted on the disk device according to Embodiment 3. FIG. 14 shows the condition in which the traverse unit 2 is mounted on the disk device. In the disk device according to Embodiment 3, the boss supporting portions 5a and 5b of the main chassis 10 are constructed similarly to those of Embodiment 2. In other words, the inserting direction of the bosses 21a and 21b into the boss supporting portions 5a and 5b is the direction of Y-axis, so that the bosses 21a and 21b resist being dropped out of the boss supporting portions 5a and 5b. Additionally, in Embodiment 3, the protrusions 22a and 22b (similar to those of Embodiment 1) are formed on the tip portion of the bosses 21a and 21b of the traverse chassis 20. The protrusions 22a and 22b face the outer surfaces of the side walls 6a and 6b so that the protrusions 22a and 22b are able to abut against the outer surfaces of the side walls 6a and 6b.

Figure 15:
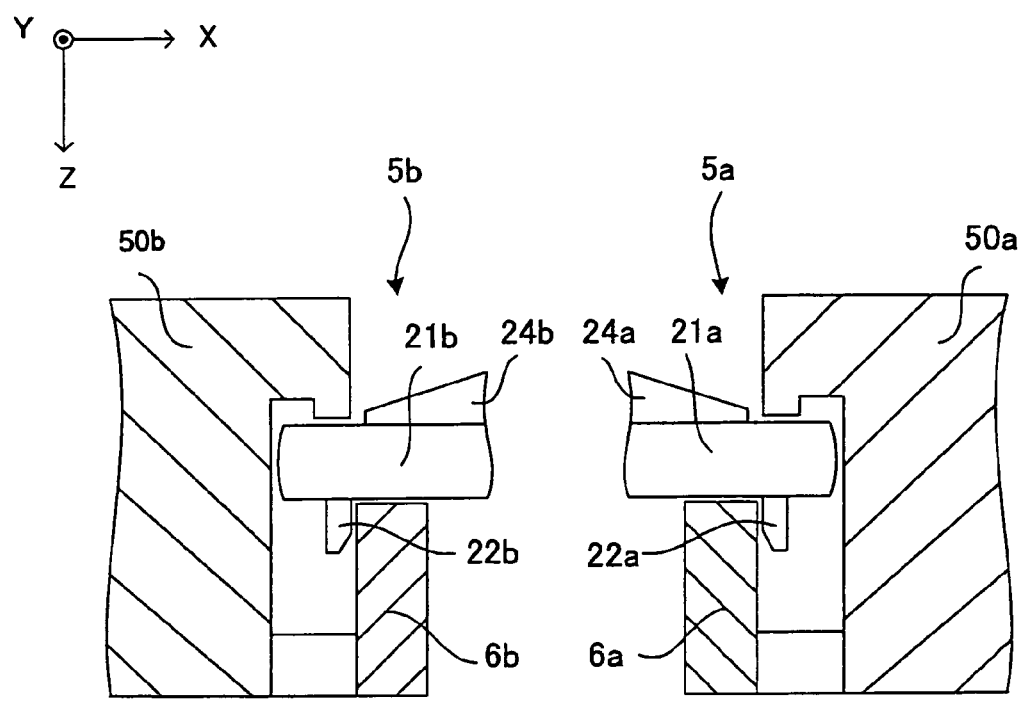
FIG. 15 is a schematic view showing an advantage obtained by the disk device according to Embodiment 3 of the present invention.

FIG. 15 is a schematic view showing the advantage obtained by Embodiment 3 in such manner that the negative side of Z-axis is directed upward, and the positive side of X-axis is directed to the right. As described above, the protrusions 22a and 22b formed on the bosses 21a and 21b face the outer surfaces of the side walls 6a and 6b and are able to abut against the outer surfaces of the side walls 6a and 6b. Therefore, even when the boss supporting portion 5a and 5b are going to be resiliently deformed in the directions away from each other in the case where the impact (caused by the falling of the disk device or the like) acts on the boss supporting portions 5a and 5b, the resilient deformation is prevented by the protrusions 22a and 22b.

As described above, in Embodiment 3, the protrusions 22a and 22b of the bosses 21a and 21b prevent the resilient deformation of the boss supporting portions 5a and 5b in the directions away from each other, in addition to the construction of Embodiment 2. Therefore, the bosses 21a and 21b further resist being dropped out of the boss supporting portions 5a and 5b unless the bosses 21a and 21b or the boss supporting portions 5a and 5b are broken. Accordingly, the dropping of the traverse unit 2 is further prevented, and the resistance to impact is further enhanced.

Embodiment 4

Figure 16:
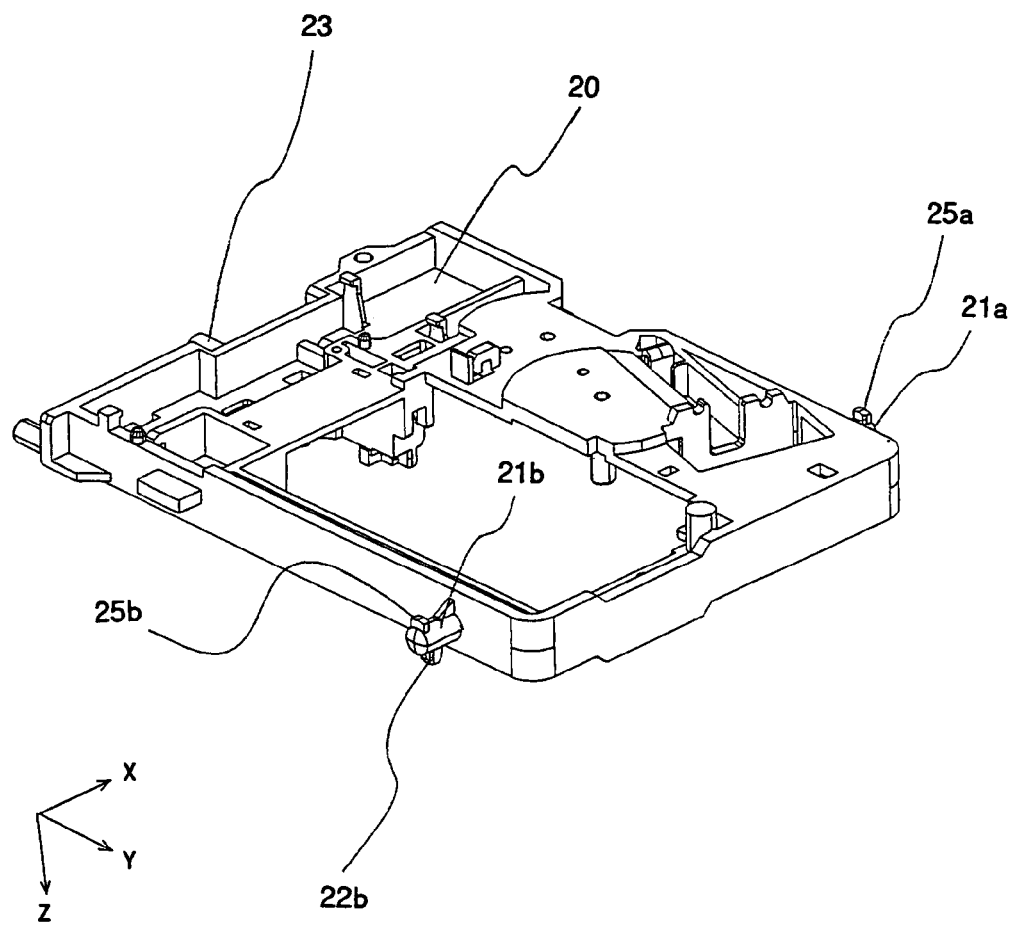
FIG. 16 is a perspective view showing a traverse chassis of the disk device according to Embodiment 4 of the present invention.
Figure 17:
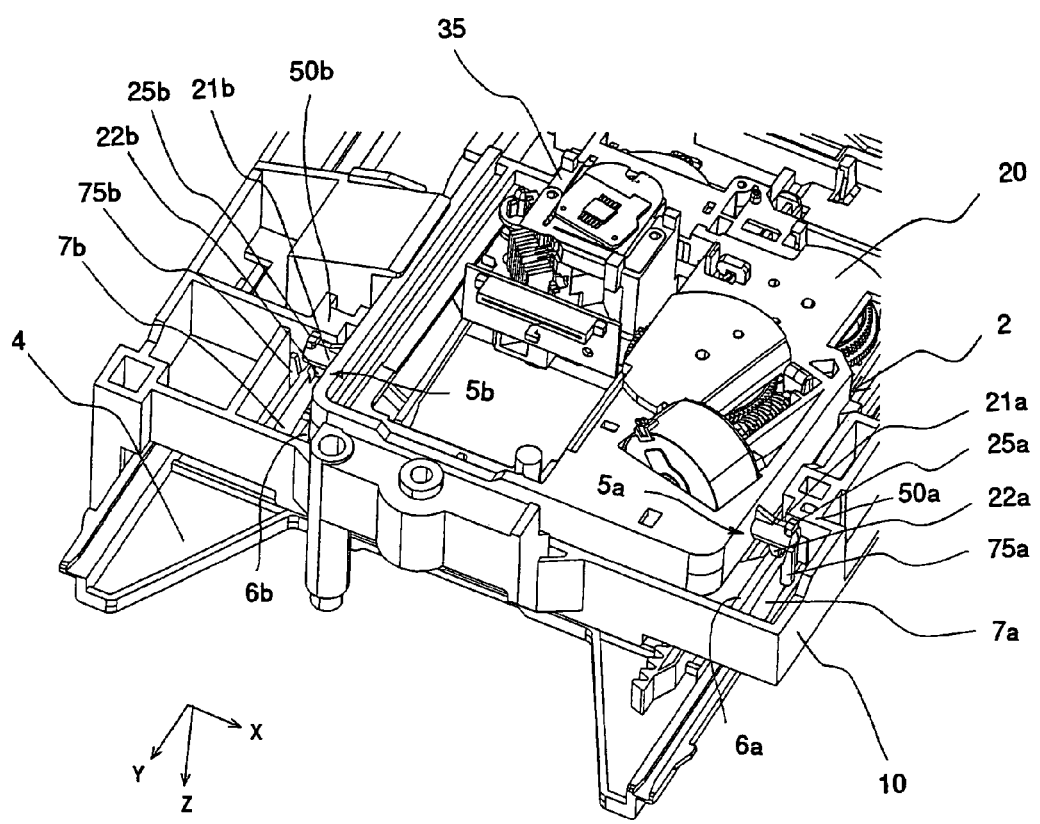
FIG. 17 is a perspective view showing a condition immediately before the traverse unit is mounted on the disk device according to Embodiment 4 of the present invention.
Figure 18:
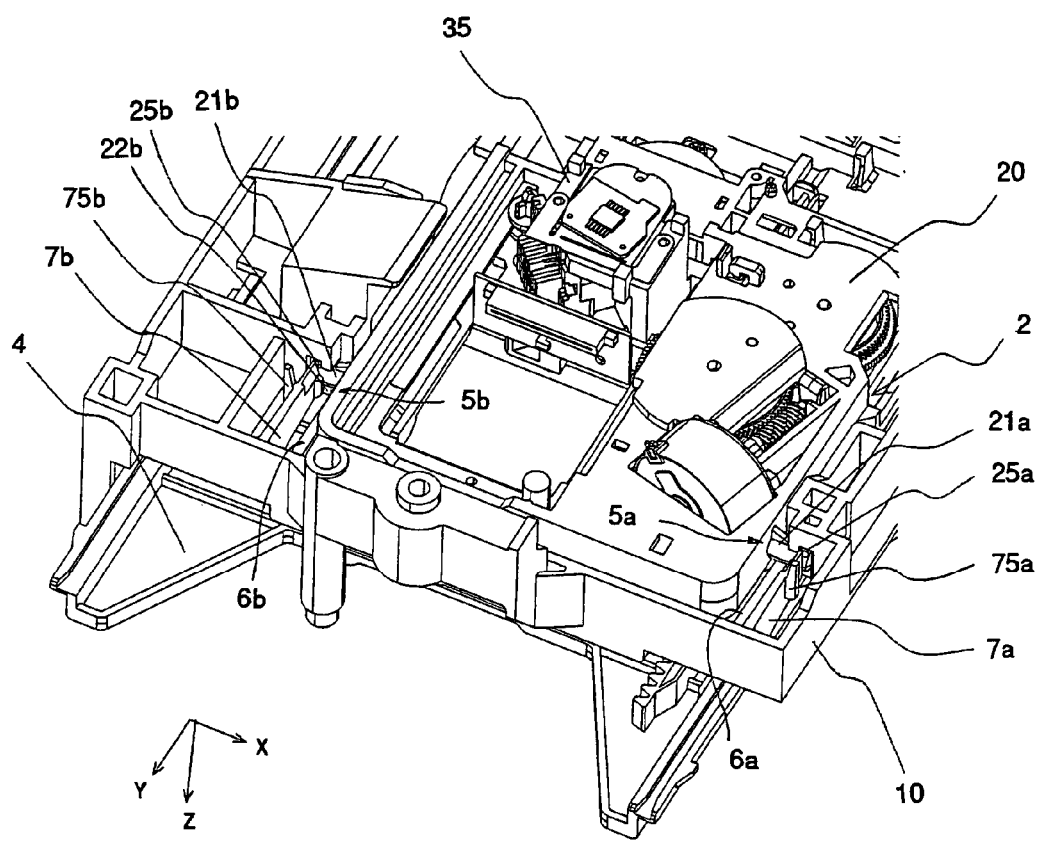
FIG. 18 is a perspective view showing the disk device according to Embodiment 4 of the present invention.

FIG. 16 is a perspective view illustrated in such a manner that the negative side of Z-axis is directed upward and the positive side of Y-axis is directed to the lower-right. FIGS. 17 and 18 are perspective illustrated in such a manner that the negative side of Z-axis is directed upward and the positive side of Y-axis is directed to the lower-left. FIG. 16 shows a traverse chassis 20 of a disk device according to Embodiment 4. FIG. 17 shows the condition immediately before the traverse unit 2 is mounted on the disk device according to Embodiment 4. FIG. 18 shows the condition in which the traverse unit 2 is mounted on the disk device. As shown in FIGS. 16 and 17, the bosses 21a and 21b of the traverse chassis 20 have protrusions 25a and 25b, in addition to the protrusions 22a and 22b described in Embodiment 3. The protrusion 25a is formed on the tip side of the boss 21a with respect to the protrusion 22a, and projects in the direction opposite to the protrusion 22a. Similarly, the protrusion 25b is formed on the tip side of the boss 21b with respect to the protrusion 22b, and projects in the direction opposite to the protrusion 22b.

Figure 19:
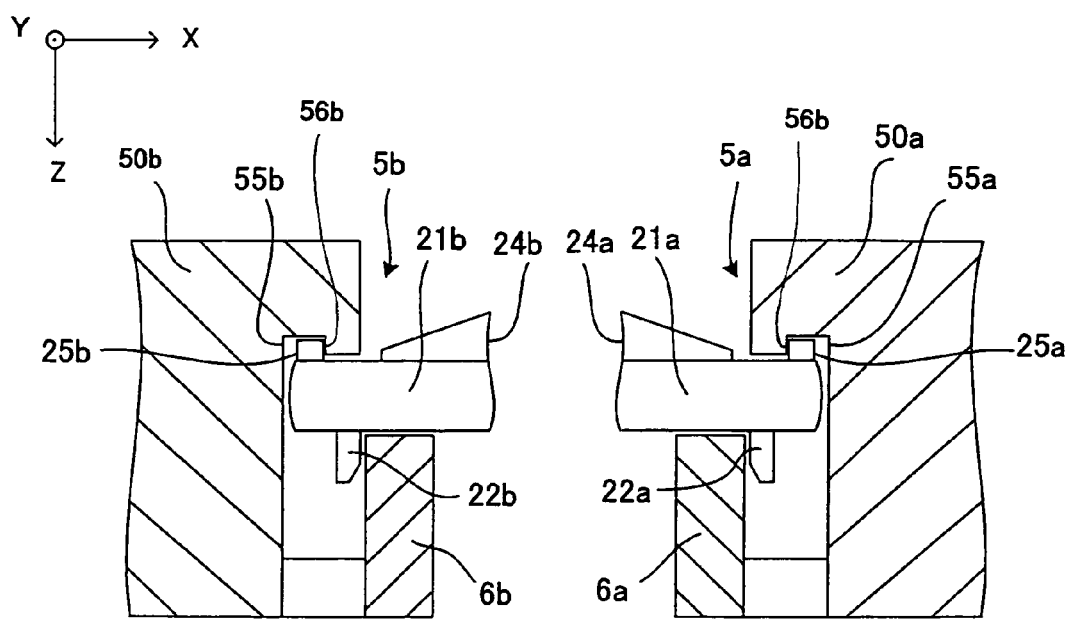
FIG. 19 is a schematic view showing an advantage obtained by the disk device according to Embodiment 4 of the present invention.

FIG. 19 is a schematic view showing an advantage obtained by Embodiment 4 in such a manner that the negative side of Z-axis is directed upward and the positive side of Y-axis is directed to the right. When the bosses 21a and 21b are to be inserted into the boss supporting portions 5a and 5b, the protrusions 22a and 22b face the outer surfaces of the side walls 6a and 6b so that the protrusions 22a and 22b are able to abut against the outer surfaces of the side walls 6a and 6b. Further, the protrusions 25a and 25b face inner surfaces (i.e., surfaces facing outside in the direction of X-axis) 56a and 56b of cutaway portions 55a and 55b formed on the blocks 50a and 50b so that the protrusions 25a and 25b are able to abut against the inner surfaces 56a and 56b of the cutaway portions 55a and 55b.

As constructed above, if the boss supporting portions 5a and 5b are going to be resiliently deformed in the directions away from each other when the impact (caused by the falling of the disk device or the like) acts on the boss supporting portions 5a and 5b, the resilient deformation is prevented by the abutting of the protrusions 22a and 22b against the inner surfaces 56a and 56b of the blocks 50a and 50b. Further, as in Embodiment 3, the deformations of the boss supporting portions 5a and 5b are also prevented by the abutting of the protrusions 22a and 22b against the outer surfaces of the side walls 6a and 6b.

As described above, according to Embodiment 4, the resilient deformations of the boss supporting portions 5*a* and 5*b* are further prevented by the protrusions 25*a* and 25*b* provided on the bosses 21*a* and 21*b* in addition to the construction of Embodiment 3. Therefore, the bosses 21*a* and 21*b* further resist being dropped out of the boss supporting portions 5*a* and 5*b*, unless the bosses 21*a* and 21*b* or the boss supporting portions 5*a* and 5*b* are broken. Accordingly, the dropping of the traverse unit 2 out of the main chassis 10 is further prevented, and the resistance to impact is enhanced.

The invention claimed is:

1. A disk device comprising:

a traverse unit including a turn table that holds and rotates a disk medium, an optical pickup that performs at least one of writing and reading of information on said disk medium, and a traverse chassis that supports them;

a carrier that carries said disk medium between a loading position and an unloading position; and a main chassis supporting said traverse unit so that said traverse unit is capable of rotating, allowing said traverse unit to move toward and away from said disk medium, wherein said traverse chassis has a pair of coaxial rotation shafts for said rotating, and said main chassis has a pair of supporting portions respectively supporting said rotation shafts, and wherein said supporting portions include groove portions that open in a direction substantially parallel to the carrying direction of said disk medium carried by said word carrier, and resiliently deformable position-regulating members that regulate the positions of said rotation shafts so as to prevent said rotation shafts from being dropped out of said groove portions.

2. The disk device according to claim 1, wherein said position-regulating members are elongated members elongated in the direction substantially parallel to the carrying direction of said disk medium carried by said carrying means.

3. The disk device according to claim 1, wherein said rotation shafts have abutting portions that abut against said supporting portions so as to prevent said pair of supporting portions from being deformed in the directions away from each other.

4. The disk device according to claim 3, wherein said abutting portion includes two or more protrusions respectively protruding in different directions.

5. The disk device according to claim 4, wherein said protrusions are formed on the tip portion of said rotation shafts.

* * * * *